Dec. 15, 1925.　　　　　　　　　　　　　　　　　　1,566,003
H. W. HILL
LENS BLOCK
Filed May 12, 1921　　　　　2 Sheets-Sheet 1
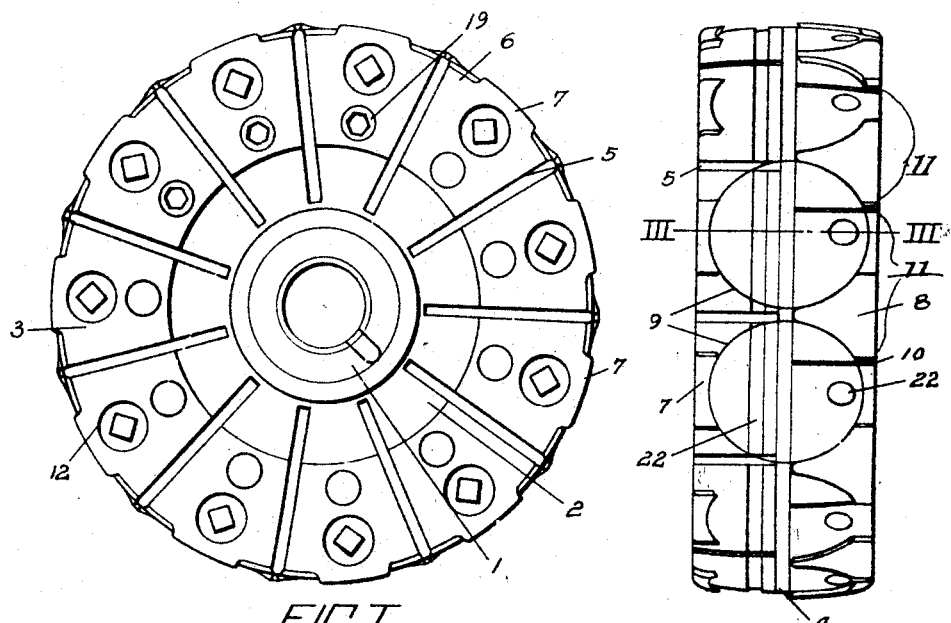
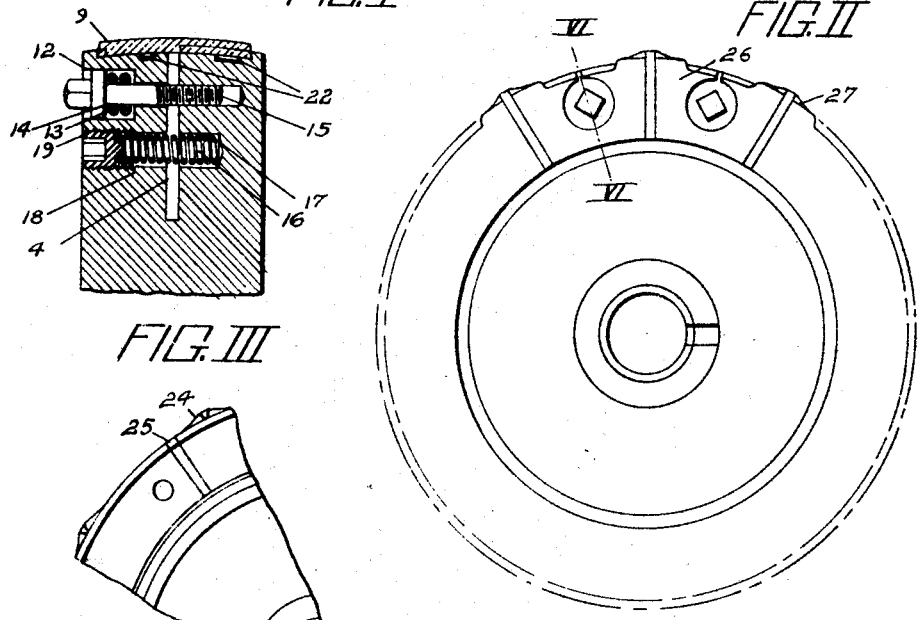
INVENTOR
HARRY W. HILL
BY
H. H. Styll & H. H. Parsons
ATTORNEYS Dec. 15, 1925.                                          1,566,003
H. W. HILL
LENS BLOCK
Filed May 12, 1921          2 Sheets-Sheet 2
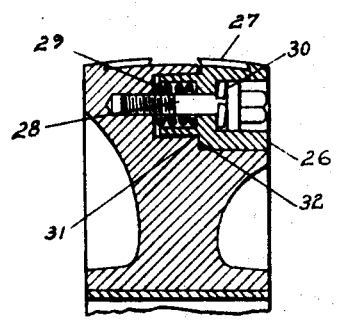
FIG. VI
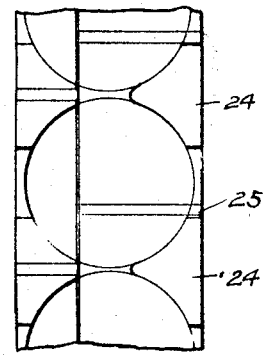
FIG. VII
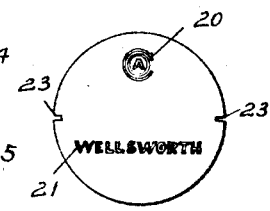
FIG. VIII
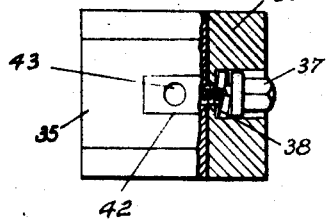
FIG. IX
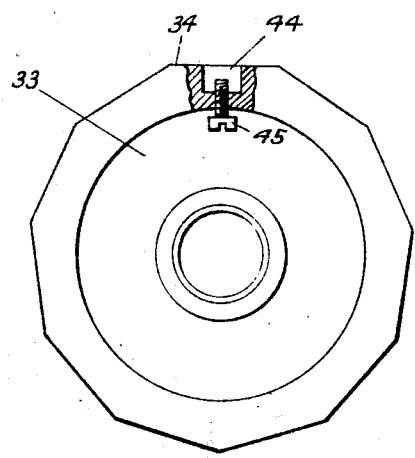
FIG. X
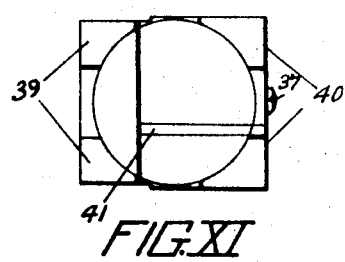
FIG. XI
INVENTOR
HARRY W. HILL
BY
H. H. Styll    Parsons
ATTORNEYS Patented Dec. 15, 1925.

1,566,003

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS BLOCK.

Application filed May 12, 1921. Serial No. 468,877.

*To all whom it may concern:*

Be it known that I, HARRY W. HILL, a citizen of the United States, residing at Southbridge, in the county of Worcester and State of Massachusetts, have invented certain new and useful Improvements in Lens Blocks, of which the following is a specification.

This invention relates to improvements in lens blocks and has for its leading object the provision of a novel and improved construction of blocking device which will satisfactorily hold ophthalmic lenses for the grinding operation without the necessity of employment of pitch or other adhesive substances.

One of the objects of the present invention, therefore, is the provision of practicable construction which will eliminate the necessity of fastening the lenses to the block by adhesive and by subsequently disengaging the lenses and cleansing them from the adhesive.

A further object of the invention is the provision of an improved device of this character which shall be so constructed as to reduce to a minimum danger of breakage of the lenses due to temperature changes or the like during the time the same are mounted in position on the block.

A further object of the present invention is the provision of a novel and improved construction of lens block which may be employed as a universal unit or may be assembled in series with other units to form a complete blocking device designed to hold a number of lenses for simultaneous grinding.

Other objects and advantages of my improved construction should be readily apparent by reference to the following specification taken in connection with the accompanying drawings, and it will be understood that I may make any modifications in the specific details of constructions and combination and arrangement of parts shown within the scope of the accompanying claims without departing from or exceeding the spirit of my invention.

Figure I represents a side elevation of one form of blocking apparatus.

Figure II represents a fragmentary plan view thereof.

Figure III represents a sectional view taken as on the line III—III of Figure II.

Figure IV represents a view similar to Figure I of a slightly modified type of construction.

Figure V represents an enlarged fragmentary view with one of the clamping members removed.

Figure VI represents a sectional view taken as on the line VI—VI of Figure IV.

Figure VII represents a fragmentary plan view of the block.

Figure VIII represents a detail view of a lens designed to be mounted within the clamp as shown in Figure VII.

Figure IX represents a bottom plan view of an individual clamp unit.

Figure X represents a sectional view through the wheel for use in connection with this unit.

Figure XI represents a plan view of the unit.

In the drawings, the numeral 1 designates the hub or center of my improved lens blocking device, which I have shown in the form of a wheel especially adapted to receive blanks intended for toric grinding, this being the most difficult form of blocking at present due to the necessity of exact axial positioning of the blank and the other particular requirements for this grinding. The hub 1 has a web portion 2 terminating in a widened rim designated as an entirety by the numeral 3. This rim has the circumferential slot 4 formed therein and on one side a plurality of radial slots 5 providing the resilient arm portions 6. These portions 6 are each provided with an undercut or inwardly bevelled lens clamp jaw 7, while the opposite portion of the disk is provided with a pair of cooperating jaw portions 8. It is to be noted that each pair of jaw portions 8 designed to engage one side of the lens 9 are divided from each other by a slight slot 10. The purpose of this particular slot arrangement is to prevent breakage of a lens in case the same is left blocked over night for example, or for an appreciable period. I have found in the use of my improved blocks that in the absence of such a provision if there is sufficient temperature change to cause shrinkage or contraction of the material of the block, the lenses are liable to be broken. With the improved construction just referred to, however, the shrinkage strain is so distributed that the sector indicated by the bracket and numeral 11 will tend to shrink together and if anything slightly loosen the grip on the lens rather than the pair of jaws 8 shrinking toward each other and applying additional or breaking pressure against the lens, the slot 10, therefore, forming a safety factor to eliminate the possibility of the jaws shrinking toward each other on contraction of the metal and thus breaking the lens.

This is a factor which should be given important consideration in connection with any type of mechanical blocking device and one which has been given special attention in designing my improved construction.

In the attempt to eliminate breakage of the lens due to improper clamping in the initial mounting of the parts, I provide the improved clamping mechanism illustrated in Figure III, in which the loose clamp jaw 6 is provided with the socket 12 to receive the clamp spring 13 which is engaged by the shoulder 14 on the clamp screw 15 engaged in a suitable socket in the rigid portion of the wheel. As this screw is tightened the spring 13 is first compressed and through compression of the spring the jaw 7 moved toward the jaws 8 to clampingly secure the lens 9, the lens, however, being thus held by a resilient or yielding force rather than a positive screw force taking up the strain. If desired the depth of socket for the screw 15 may be made such as to stop the rotation of the screw before the spring 13 is unduly compressed so that any variations in size of the lens are taken up by the yield of the spring, which is made stiffer than the spring of the jaw or arm 6. In the event that the member 3 as an entirety is made from a material having a limited amount of spring or resiliency, I may add to this resiliency and tendency of the jaws to spring open a positive opening means, such as the spring 16 contained in the socket 17 and passage 18 of the two parts of the jaws, its tension being adjusted and the screw secured in position by the lag screw 19, as is best illustrated by Figure III of the drawings. It will be understood that the lenses intended to be used in connection with my invention are ordinarily of the type shown in Figure VIII bearing a suitable trade-mark indicated at 20 and frequently a second name or trade-mark as shown at 21, these being molded in raised letters on the back surface of the blank. To enable the blank to be properly supported on the surface of the block and eliminate any uneven tilting or the like due to these raised letters I preferably form in the block the grooves or recesses 22 of proper depth so that the raised letters may fit down into the grooves without contact therewith. These grooves or recesses further aid in securing correct positioning of the lens which may have formed or molded thereon suitable axis designations such as 23 to correspond with either the center line or split of the block or a surface designation thereon, as may be preferred.

In Figures IV to VII inclusive I have shown in detail a type of mechanism quite similar to that just described, with the exception that in place of the entire device being in one piece the wheel with the jaws 24 is in one section and provided with the contraction slots 25 corresponding to the slots 10, while the jaw member is a separate piece or slide 26 having the lens clamping jaws 27 and secured in position by the set screw 28. In this case the spring 29 serves to urge the sliding jaw outward into open or operative position and a suitable spring member 30 interposed between the head of the screw and the slide block allows a yielding pressure to be inserted against the slide block bringing it into clamping engagement with a lens 21. In this form of the invention the main or body portion of the wheel is provided with a shoulder 31 abutting the shoulder 32 of the slide. These shoulders are adapted to contact just before the jaws are so adjusted as to clamp the lens so there will be a slight inward tilting as the lens is clamped tending to draw the lens down centrally into tight engagement with the metal of the block so it will be properly supported during the grinding operation.

In Figures IX, X and XI, of the drawings is shown a construction accomplishing the same result as that hitherto described and in a similar manner, with the exception that in this instance the wheel 33 is provided with a plurality of seats 34 to receive the lens clamping blocks comprising a main section 35 and 36 drawn together as by the screw 37 acting on the interposed spring washer 38 to resiliently clamp the lens. The member 35 has the clamping jaws 39 and the member 36 has the jaws 40 for this purpose. In each individual clamp the jaws are supported as by the slots 41 to prevent breakage of the lens through contraction of the material. The member 35 has projecting therefrom the lug 42 with central socket 43. These clamps may be individually employed as for separate or prescription grinding of a particular lens, or the lugs 42 may be placed in the sockets 44 of the wheel 33 and there secured as by the screw 45, building up a composite wheel of a plurality of individual clamps when wheel or similar grinding is to be employed.

From the foregoing description taken in connection with the accompanying drawings the construction and operation of my improved blocking mechanism should be readily understood, and it will be seen that I have provided novel and improved positively locked but resiliently held lens clamping or blocking mechanism in which the possibility of breakage of the lens due to undue clamping strain or to expansion and contraction of the parts is reduced to a minimum.

I claim:

1. In a device of the character described, a wheel having a peripheral groove and peripheral jaw clamps, means for drawing the parts separated by the peripheral groove toward each other, and resilient means on the drawing means reacting against the tendency of the separated parts to separate.

2. In a device of the character described, a wheel having a peripheral groove and peripheral jaw clamps, means for drawing the parts separated by the peripheral groove toward each other, resilient means on the drawing means reacting against tendency of the separated parts to separate, and additional resilient means tending to separate the separated parts.

3. In a device of the character described, a wheel having a peripheral groove and peripheral jaw clamps and radial grooves separating the jaw clamps and extending from the peripheral groove toward the outside edge of the wheel.

4. In a device of the character described, a wheel, peripheral lens clamps on each side of the wheel, a spring and a transverse screw adapted to force the lens clamps towards each other against the spring which tends to force the lens clamps away from each other.

5. In a device of the character described, a wheel, peripheral lens clamps on the wheel, said wheel having a peripheral groove between the lens clamps longitudinally, and radial grooves between the clamps transversely, for the purposes described.

In testimony whereof I have affixed my signature.

HARRY W. HILL.